(12) United States Patent
Horiuchi et al.

(10) Patent No.: US 11,467,784 B2
(45) Date of Patent: Oct. 11, 2022

(54) INFORMATION PROCESSING APPARATUS, IMAGE COLLATING METHOD, AND PROGRAM

(71) Applicants: Tsuyoshi Sakamoto, Tokyo (JP); Tatsuroh Yoshioka, Tokyo (JP); Kazuhiro Miyabe, Tokyo (JP); National University Corporation Chiba University, Chiba (JP)

(72) Inventors: Takahiko Horiuchi, Chiba (JP); Ren Nakamura, Chiba (JP); Midori Tanaka, Chiba (JP); Shoko Imaizumi, Chiba (JP); Tsuyoshi Sakamoto, Kanagawa (JP); Tatsuroh Yoshioka, Kanagawa (JP); Kazuhiro Miyabe, Kanagawa (JP)

(73) Assignees: Ricoh Company, Ltd., Tokyo (JP); National University Corporation Chiba University, Chiba (JP)

( * ) Notice: Subject to any disclaimer, the term of this patent is extended or adjusted under 35 U.S.C. 154(b) by 0 days.

(21) Appl. No.: 17/447,084

(22) Filed: Sep. 8, 2021

(65) Prior Publication Data
US 2022/0075573 A1  Mar. 10, 2022

(30) Foreign Application Priority Data
Sep. 9, 2020  (JP) .............................. JP2020-151586

(51) Int. Cl.
*G06F 3/12* (2006.01)
*H04N 1/52* (2006.01)
(Continued)

(52) U.S. Cl.
CPC .......... *G06F 3/1208* (2013.01); *G06F 3/1259* (2013.01); *H04N 1/52* (2013.01); *H04N 1/603* (2013.01); *H04N 1/12* (2013.01)

(58) Field of Classification Search
CPC ....... G06F 3/1208; G06F 3/1259; H04N 1/52; H04N 1/603; H04N 1/6016; H04N 1/6052; H04N 1/12; G06T 7/00
(Continued)

(56) References Cited

U.S. PATENT DOCUMENTS 5,032,903 A * 7/1991 Suzuki ................. H04N 1/6022
358/448
5,729,634 A * 3/1998 Robinson ............. H04N 1/4058
358/3.17
(Continued)

FOREIGN PATENT DOCUMENTS

JP  2020-004345  1/2020

OTHER PUBLICATIONS

Zhang Xuemei et al., "A Spatial Extension of Cielab for Digital Color Image Reproduction", SID International Symposium Digest of Technical Papers, vol. 27, 1996.

*Primary Examiner* — Darryl V Dottin
(74) *Attorney, Agent, or Firm* — IPUSA, PLLC

(57) ABSTRACT

An information processing apparatus includes circuitry and a memory, the circuitry performing perceptual image conversion of converting two image data generated from one color image data respectively into perceptual images based on human visual characteristics, collation of determining whether the two perceptual images converted by the perceptual image conversion are same, and comparison result outputting of outputting the comparison result by the collation.

13 Claims, 20 Drawing Sheets

(51) Int. Cl.
*H04N 1/60* (2006.01)
*H04N 1/12* (2006.01)

(58) Field of Classification Search
USPC .......................................................... 358/1.16
See application file for complete search history.

(56) References Cited

U.S. PATENT DOCUMENTS

| | | | |
|---|---|---|---|
| 5,805,178 A * | 9/1998 | Silverbrook | H04N 1/40087 |
| | | | 347/15 |
| 2018/0007233 A1* | 1/2018 | Aramaki | G06V 30/413 |

* cited by examiner

INFORMATION PROCESSING APPARATUS, IMAGE COLLATING METHOD, AND PROGRAM

CROSS-REFERENCE TO RELATED APPLICATIONS

The present application claims priority under 35 U.S.C. § 119 to Japanese Patent Application No. 2020-151586, filed Sep. 9, 2020, the contents of which are incorporated herein by reference in their entirety.

BACKGROUND OF THE INVENTION

Field of the Invention

The present invention relates to an information processing apparatus, image collating method, and program.

Background Art

In image printing, it is important to obtain a unique output result when image data are input into a printing system. This is particularly important in areas such as commercial printing, in which high-quality prints are required. If the printing system fails to acquire the same output result contrary to a user's expectation, the print quality required by a customer cannot be satisfied by the printing system. However, it is not easy to solve this problem. One of the reasons for a difference in outputs in image printing resides in a process of converting RGB data to a CMYK halftone image by a process of a printer driver. A difference in an operating system or printer driver of the information processing apparatus used in this process causes differences in image processing and calculation accuracy, which results in conversion to different halftone images.

A technique for comparing two images exists in a conventional technique (see, for example, Patent Document 1). Patent Document 1 discloses an image collating system, in which the electronic data of a printed matter is compared with the digitized data of a printed matter as the master image data, and it is determined whether the master image data matches the electronic data of a printed matter.

[Patent Document 1]
Japanese Patent Application Laid-Open No. 2020-4345

[Non-Patent Document 1]
Zhang Xuemei, and Brian A. Wandell, "A spatial extension of CIELAB for digital color image reproduction", SID International Symposium Digest of Technical Papers, Vol. 27, 1996

SUMMARY OF THE INVENTION

However, background art has a purpose of performing a determination of match or mismatch of two image data using signal processing. The background art has a problem in that the determination in consideration of ambiguity is difficult to perform. Said differently, a collation whether the images completely match can be easily determined by obtaining a difference image using calculation performed by a program or the like. Therefore, it is easy to select images having partly different output results. However, it is difficult to make an ambiguous determination. The ambiguous determination means a determination of a difference that is not recognized by a human is also determined by the system as not being present. In addition, the background art is unable to be applied to halftone images.

An object of the present invention is to provide an information processing apparatus capable of approximating a determination of whether two image data are the same to a human determination result.

In view of the above-described object, the present invention provides an information processing apparatus including circuitry and a memory, the circuitry performing perceptual image conversion of converting two image data generated from one color image data respectively into perceptual images based on human visual characteristics, collation of determining whether the two perceptual images converted by the perceptual image conversion are same, and comparison result output of outputting the comparison result by the collation.

DESCRIPTION OF THE EMBODIMENTS

Hereinafter, as an example of an embodiment of the present invention, an information processing apparatus, and an image collating method performed by the information processing apparatus will be described with reference to the drawings.

<Further Explanation of Background Art Concerning Sameness Determination>

Figure 1:
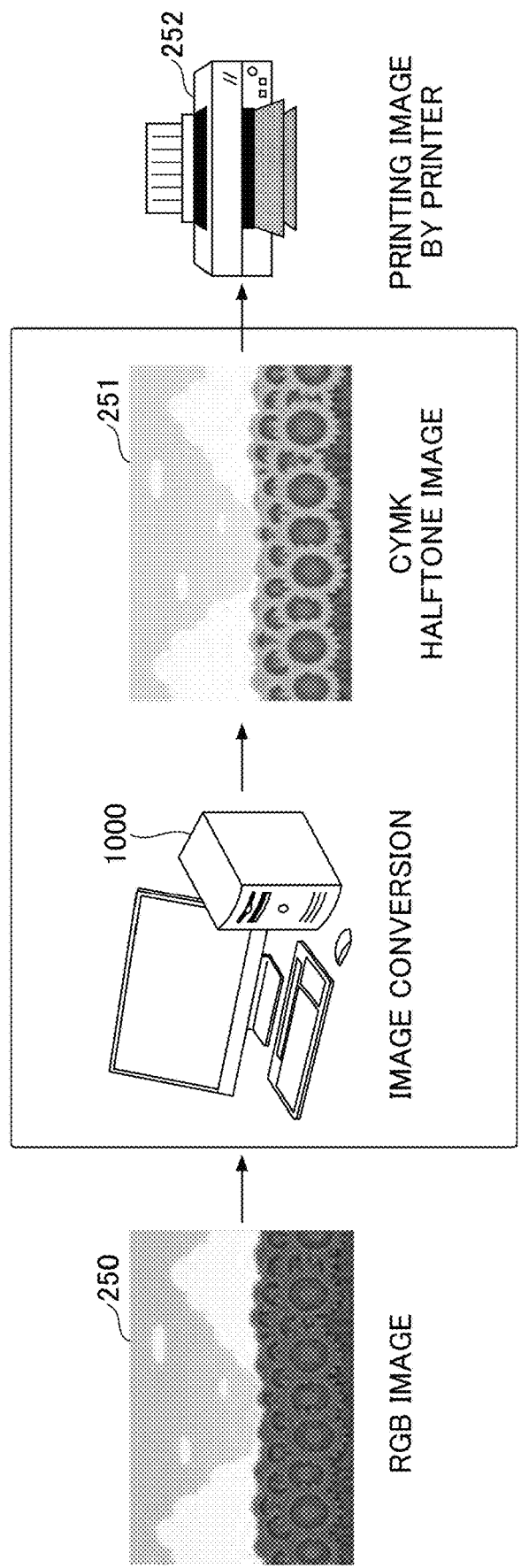
FIG. 1 illustrates a process in which two images differ in image printing.

In describing the determination method of the present embodiment, the background art is further explained. FIG. 1 illustrates a process in which a difference occurs between two images in image printing. As illustrated in FIG. 1, for example, a 24-bit RGB data 250 is input to the information processing apparatus 1000. The information processing apparatus 1000 converts the RGB data into a CYMK halftone image 251 by dither processing, error diffusion processing, or the like. The dither processing and error diffusion processing are image processing methods, in which the number of colors and/or the number of gradations of an image is reduced to express a pseudo intermediate color. The dither processing or error diffusion processing takes place in a state where at least one of the numbers of bits in the OS and the printer drivers is different. The printing device 252 prints a CMYK halftone image 251 to a paper or the like corresponding to a point of toner or ink.

However, the difference in at least one of the OS and the printer driver of the information processing apparatus 1000 used in the process of rendering the RGB data to the halftone image causes a difference in the image processing and calculation accuracy. It is known that if the operating system or printer driver used by the information processing apparatus 1000 is changed to another operating system or printer driver, the conversion by the information processing apparatus 1000 may be to a different halftone image 251.

Figure 2:
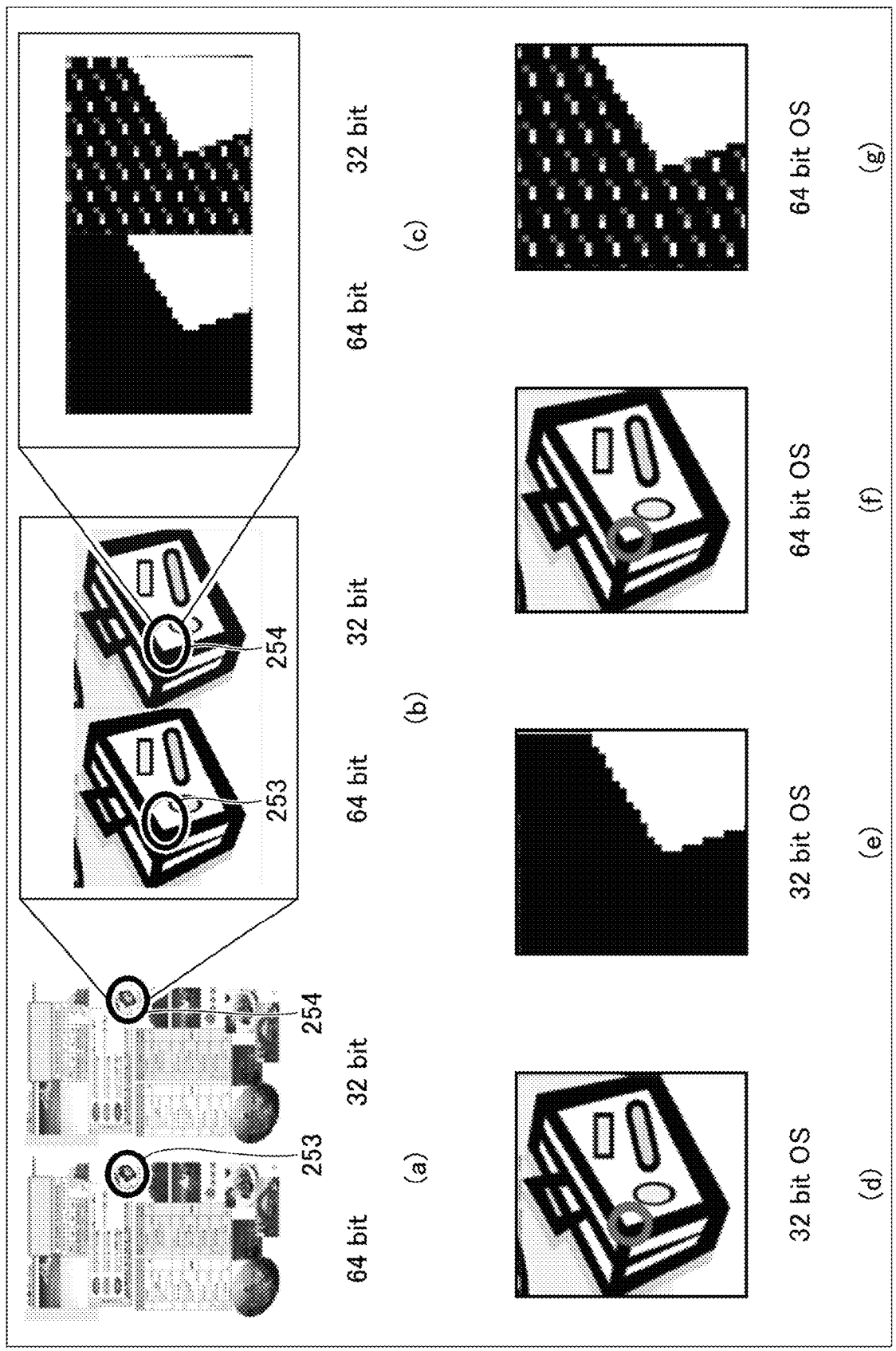
FIG. 2 illustrates an example of differences in halftone images according to differences in OS.

FIG. 2 illustrates an example of a difference in the halftone image caused by a difference in the OS. In FIG. 2, (a) illustrates a halftone image converted by operating systems (32-bit Windows ("Windows" is a registered trademark)) and 64-bit Windows ("Windows" is a registered trademark)) having different bit numbers.

In FIG. 2, (b) illustrates enlarged images in circles 253 and 254 included in the images (a). In FIG. 2, (c) illustrates images of further enlarged circles 253 and 254 of the images (b). Regarding (b), differences in halftone images due to the difference of the operating systems are not conspicuous. However, as illustrated in the image in FIG. 2, (c), a frame line of the image converted by the 32-bit OS is expressed by a single black color, and a frame line of the image converted by the 64-bit OS is expressed by mixture of CMYK. These expressions can also be confirmed in FIG. 2, (d)-(e) and (f)-(g), which are obtained by enlarging (c). In FIG. 2, (d)-(e) illustrate halftone images obtained by the 32-bit OS, and (f)-(g) illustrate halftone images obtained by the 64-bit OS.

It is also confirmed that at least one of the OS and the printer driver of the information processing apparatus 1000 causes not only the color difference as illustrated in FIGS. 1 and 2 but also a variety of differences in the thicknesses of the frame lines or the like. In recent years, newer operating systems and newer printer drivers are going to be developed from one to the next, and newer hardware is updated from one to the next. Therefore, the possibility of converting unique image data to different halftone images is being increased.

Collation of whether the two images completely match can be easily performed by generating a difference image, in which the difference of pixel values is computed for each pixel by the information processing apparatus 1000. However, if the quality standard of the printing system requires that a difference which cannot be recognized by a human needs to be determined, the quality standard for the printing system (factors affecting image quality such as OS, printer driver, information processing apparatus, and printing device) becomes excessive and cannot be used in a practical manner. It is also possible for the human to visually observe only a part which is actually visible by the human and determine whether the difference is admissible. However, a visual collation requires considerable effort. Therefore, it is demanded to construct an ambiguous collating system that reproduces a human visual model.

<Summary of Image Matching Determination in this Embodiment>

Accordingly, in this embodiment, an ambiguous determination is substantialized in which a difference that cannot be recognized by the human is allowed by the system. According to the embodiment, one of the characteristics is that the information processing apparatus can perform a match determination between the two images as follows.

(i) In "perceptual space", (ii) "two-step ambiguous image collation" is performed. Said differently, (i) in this embodiment, a perceptual space is used rather than an ordinary signal space.

In addition, (ii) this embodiment is to collate the two image data in two stages using a Region of Interest (ROI):

(1) color-difference gradient; and
(2) color-difference average.

This enables to determine the ambiguity. The ordinary signal space refers to a color space representing the image such as RGB, CMYK, XYZ, etc.

In an ordinary image collation, the object is a fingerprint, a facial image, or a stamp (a stamped seal impression). The information processing apparatus compares the image information to be compared (a shape, color, etc. is changing) with a master image to determine authenticity. This method is performed like signal processing (a method of directly comparing pixel values) irrespective of a human perceptual degree of match. Therefore, the ordinary image collation cannot be applied to the human perceptual ambiguity collation that is the object of this embodiment.

Figure 3:
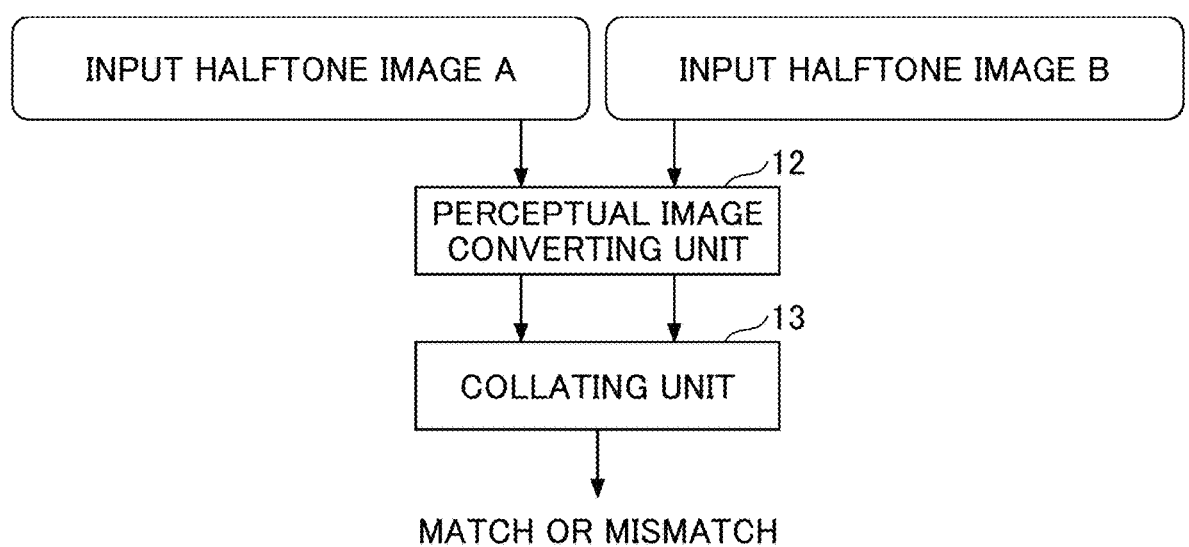
FIG. 3 illustrates a determination of whether two images match.

FIG. 3 schematically illustrates how to determine whether the two images match in this embodiment. In this embodiment, the two images are collated in a human perception space based on the visual model, and a collation determination (a sameness determination) is performed based on the visual characteristics.

The input images are originally the same RGB image. Two CMYK halftone images (multivalued halftone images) converted in an environment where at least one from among the OS and printer driver is different. Because the input images are originally the same, the two halftone images have the same image size and contents. The perceptual image converting unit 12 applies a human visual filter to the halftone image to generate an image perceived by a human brain. As described above, the present embodiment wants to perform judgments close to the ambiguous perception of a person, so that the perceptual space is used instead of the image signal space.

A known visual filter is used for the perceptual image converting unit 12. For example, one example of a visual filter is disclosed in Non-Patent Document 1. Non-patent Document 1 utilizes the fact that human vision varies depending on the visual distance and image resolution. Said differently, the number of pixels per a unit view angle is used as a parameter, and parameters such as a visual distance of 50 [cm], a resolution of 600 [dpi], and so on are set to convert into the image perceived by a human brain.

Next, the collating unit 13 performs two stage collation for the two perceptual images converted by the perceptual image converting unit 12. This two stage collation allows the ambiguity to some extent. The collation is locally performed in the region of interest (ROI) corresponding between the two perceptual images. The ROI can be arbitrarily selected. For example, a visual field of two degrees, which is the central visual field of humans, may be used. In this embodiment, the ROI is rectangular, but may be circular.

The collation is based on the knowledge that it is difficult for humans to visually recognize the difference because the spatial color change is relatively small at a place where the color difference equally changes in the perceptual space. The first stage uses a gradient average of the color difference in the ROI of the two images converted by the perceptual image converting unit 12. The known method may be used to calculate the gradient. For example, the collating unit 13 may use a Prewitt filter. Even if there is present at least one ROI having the gradient average greater than a threshold, the collating unit 13 determines that the two halftone images mismatch.

The second stage collation is performed by the collating unit 13 for the two halftone images that did not mismatch in the first stage. In the first stage, the mismatch is determined in a case where a spatial color change is large. In the second stage, a color-difference average within the ROI is used to complement the first stage. Specifically, when there is at least one ROI having the color-difference average equal to or greater than the threshold value, the collating unit 13 determines that the two halftone images mismatch.

As a result of the above-described processing, the information processing apparatus according to the present embodiment can perform an ambiguous determination that is similar to the human visual recognition.

<Terminology>

The two image data generated by differently processing one color image data means image data generated by performing different image processings for the same original image. For example, the image data is generated by printer drivers having different versions or generated by a printer driver operated in different operating systems. If the two image data are halftone images, the image processing may include dither processing or error diffusion processing.

The different OSS means the OSS having different bit numbers but having the same name, OSS being different versions but having the same name, or the like. The different OS may include a differently named OS (e.g., Windows ("Windows" is a registered trademark) and MAC OS ("MAC OS" is a registered trademark), Linux ("Linux" is a registered trademark) and UNIX ("UNIX" is a registered trademark), etc.).

The different printer drivers may include drivers common to the model and drivers dedicated to the different models, in addition to different versions. The different printer drivers may also include printer drivers for different OS (e.g., Windows ("Windows" is a registered trademark) and MAC OS ("MAC OS" is a registered trademark).

A perceptual image is an image converted from the original image based on human visual characteristics. In this embodiment, an example is a perceptual image called S-CIELAB. The perceptual images are not necessarily generated in this way.

<Example of Structure>

Figure 4A:
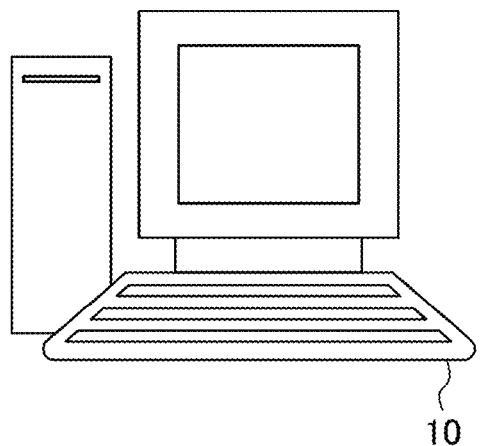
FIGS. 4A and 4B illustrate the structures of examples of an information processing apparatus and information processing system that perform a sameness determination, respectively.
Figure 4B:
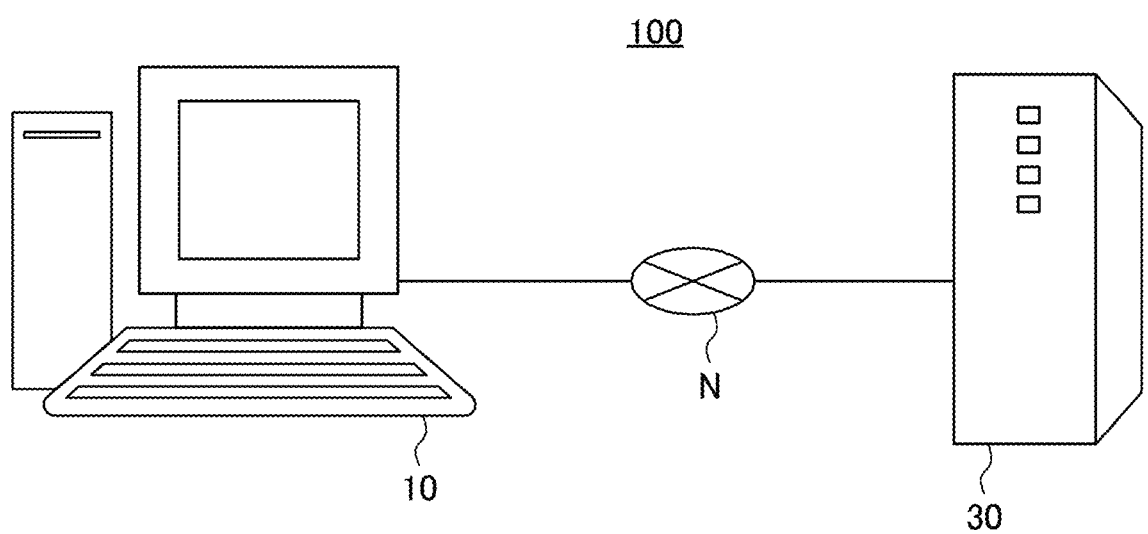

FIGS. 4A and 4B illustrate an example of the structure of an information processing apparatus 10 and an information processing system 100 each performing the sameness determination. According to the present embodiment, there is a system structure in which the information processing apparatus 10 performs the sameness determination (FIG. 4A) and a system structure in which the server 30 performs the sameness determination (FIG. 4B). In the system structure illustrated in FIG. 4A, the information processing apparatus 10 acquires two images stored in a memory unit, performs sameness determination, and outputs the determination result to a display. The determination result may be sent by email or may be stored in the memory unit. It may also be stored in a cloud.

The information processing apparatus 10 may be, for example, a PC (Personal Computer), a tablet terminal, a PDA (Personal Digital Assistant), a smartphone, an electronic blackboard, a printing device, or a projector, or the like, in which software operates.

In the information processing system 100 illustrated in FIG. 4B, the information processing apparatus 10 and the server 30 can communicate with each other through the network N. A server is a device that mainly processes information over a network and responds to requests received over the network.

In the system structure of FIG. 4B, the information processing apparatus 10 transmits two or more images to the server 30. The server 30 performs the sameness determination of the image and transmits the determination result to the information processing apparatus 10. The determination result may be sent via e-mail or saved in a cloud.

In the structure illustrated in FIG. 4B, the server 30, as a so-called web server, generates screen information (information described using HTML, XML, scripting language, and CSS (Cascading Style Sheet), which is mainly analyzed and displayed by the browser software) of the portal screen for receiving the image data and provides the screen information to the information processing apparatus 10. The web browser is operated by the information processing apparatus 10, and its screen information is received and a web page is displayed. The web page includes an interface for registering two or more images held by the information processing apparatus 10, and the user registers two or more images on the web page and transmits them to the server 30.

A web page may be provided by a web application. The web application refers to software or its configuration, which runs on a browser by causing cooperation between programs in a programming language (e.g., JavaScript ("JavaScript" is a registered trademark)) and programs on a web server. Web pages can be changed dynamically by a web application.

<Exemplary Hardware Structure>

Figure 5:
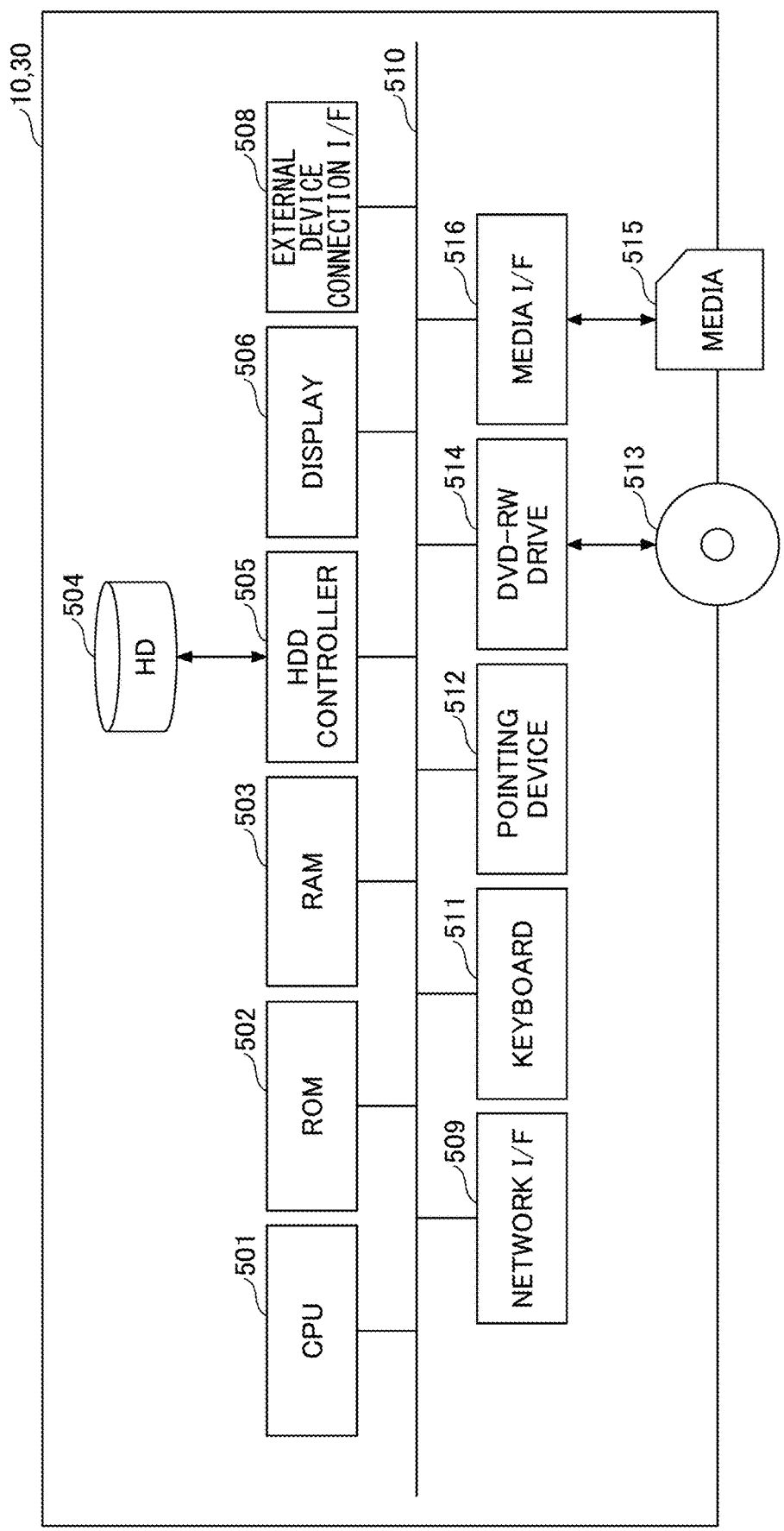
FIG. 5 is a hardware structure diagram illustrating an example of an information processing apparatus or server.

FIG. 5 is a diagram illustrating a hardware structure of an information processing apparatus 10 or a server 30. Here, the hardware structure will be described as the hardware structure of the information processing apparatus 10.

As illustrated in FIG. 5, the information processing apparatus 10 is constructed by a computer and includes a CPU 501, a ROM 502, a RAM 503, an HD 504, an HDD (hard disk drive) controller 505, a display 506, an external device connection I/F (interface) 508, a network I/F 509, a bus line 510, a keyboard 511, a pointing device 512, a DVD-RW (Digital Versatile Disk Rewritable) drive 514, and a media I/F 516, as illustrated in FIG. 5.

From among these, the CPU 501 controls the operation of the entire information processing apparatus 10. The ROM 502 stores a program used to drive the CPU 501, such as an IPL. The RAM 503 is used as the work area of the CPU 501. The HD 504 stores various data such as a program. The HDD controller 505 controls reading or writing of various data to the HD 504 in conformity with the control of the CPU 501. The display 506 displays various information such as a cursor, menu, window, character, or image. The external device connection I/F 508 is an interface for connecting various external devices. In this case, the external device may be, for example, a Universal Serial Bus (USB) memory or a printer. The network I/F 509 is an interface for performing data communication using a communication network. The bus line 510 is an address bus, a data bus, or the like for electrically connecting components such as the CPU 501 illustrated in FIG. 5.

The keyboard 511 is also a type of input means having a plurality of keys for input of characters, numbers, various instructions, and the like. The pointing device 512 is a kind of input means for selecting and executing various instructions, selecting a processing target, moving a cursor, and the like. The DVD-RW drive 514 controls reading or writing of various data to the DVD-RW 513 as an example of a removable recording medium. It is not limited to DVD-RW, but may be DVD-R, etc. The media I/F 516 controls the reading or writing (storage) of data to a recording medium 515, such as a flash memory.

<Function>

Figure 6:
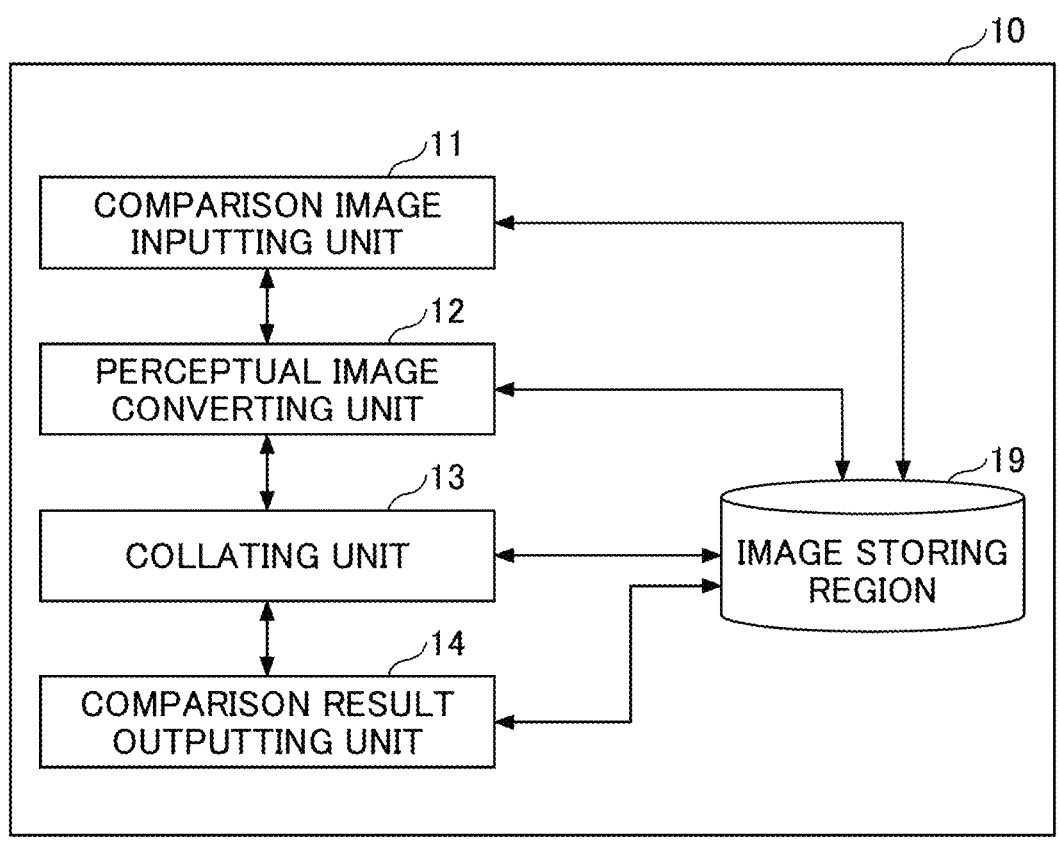
FIG. 6 is an example of a functional block diagram illustrating functions of an information processing apparatus by dividing the functions into blocks.

FIG. 6 is an example of a functional block diagram explaining the functions of the information processing apparatus 10 by dividing the functions into blocks. In FIG. 6, the function of the information processing apparatus 10 will be described, unless otherwise noted. In the case of the server 30, although there is a difference that the server 30 further includes a communication unit, the function retained by the server 30 may be the same as that of the information processing apparatus 10.

The information processing apparatus 10 includes a comparison image inputting unit 11, a perceptual image converting unit 12, a collating unit 13, and a comparison result outputting unit 14. Each of these functional units provided by the information processing apparatus 10 is a function or means that is substantialized by one of the components illustrated in FIG. 5 operating in accordance with a command from the CPU 501 according to a program expanded from the HD 504 to the RAM 503. The program can be a dedicated app or a web browser.

The information processing apparatus 10 includes an image storing region 19. The image storing region 19 is substantialized by the HD 504, the RAM 503, or the like illustrated in FIG. 5. The image storing region 19 stores the halftone image of the comparison source, the perceptual image, and the image of the comparison result (the color-difference image to be described later).

The comparison image inputting unit 11 receives two or more image data for comparison from the outside. Two or more images for comparison may or may not be halftone images. This embodiment is applicable not only to halftone images. That is, the following perceptual image converting unit 12 can convert the image data in which RGB, L*a*b*, XYZ, or the like is a color space, which can convert the image data into a perceptual image. Accordingly, the image input is not limited to the halftone images.

In addition, when image processing is performed by a different OS, a printer driver, or the like using the information processing apparatus 10 and two or more image data for comparison can be generated, the comparison image inputting unit 11 may accept the input image (for example, one RGB image).

Because it is possible to compare two or more images, for example, from among three images, the two or more image data for comparison can be generated as described above. A providing source of the two image data is not particularly limited. The providing source may be such as an external PC on the network, storage service, NAS (Network Attached Storage), portable storage medium, or another module (such as printer drivers) in the information processing apparatus 10. The input image may be that designated by the user or that transmitted from the providing source. The comparison image inputting unit 11 stores the two input image data in the image storing region 19.

The perceptual image converting unit 12 extracts two image data (for example, two halftone images) of a comparison object stored in the image storing region 19 and converts them into the perceptual images. Details thereof are given below.

The collating unit 13 compares (1) the color difference gradient and (2) the color-difference average in a region of interest ROI of the perceptual image to determine whether they are the same.

The comparison result outputting unit 14 outputs the determination result obtained by the collating unit 13 to the outside. The output destination may be the providing source, the server on the network, or the display of the information processing apparatus 10.

<Conversion to Perceptual Image>

Figure 7:
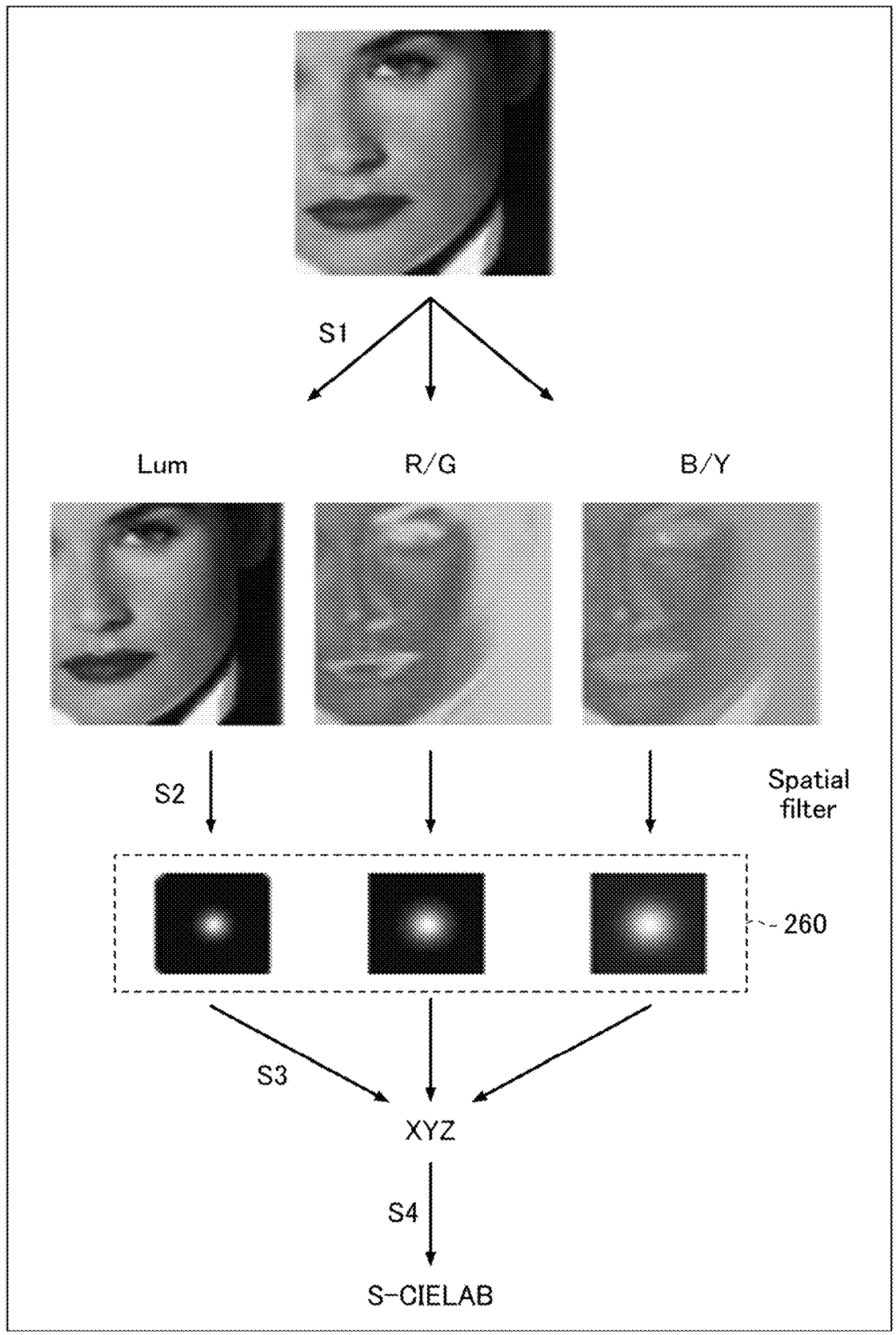
FIG. 7 is an example of a diagram explaining a method of converting to a perceptual image.

FIG. 7 illustrates a method of converting to the perceptual image.

S1: The perceptual image converting unit 12 decomposes the input image data (here, the RGB image) into an image of luminance (Lum) and two types of opposite color images (R/G image and B/Y image). This is based on the theory that light signals from the retina are decomposed into a luminance signal and two opposite color signals in course of reaching the brain. The opposite colors of the R/G are present on red (R) and green (G) axes. Humans cannot perceive R and G simultaneously. All color signals can be decomposed into R, G, and B. The opposite colors B/Y indicate the mixing ratio of the blue (B) and yellow (Y) axes. The axes of red (R) and green (G)) are mutually orthogonal. The axes of blue (B) and yellow (Y) are mutually orthogonal. In addition, an axis orthogonal to the plane consisting of the two axes is an axis of the luminance signal.

S2: The perceptual image converting unit 12 compresses information by applying a spatial filter 260 to each of the three decomposed image signals. This process is based on a theory concerning pathways to the brain. The spatial filter 260 is a low-pass filter, but its shape varies depending on the three types of signals. Much information of the luminance signal is transmitted to the brain without change. Therefore, the width of the low-pass filter is narrow and the opposite color signal is transmitted to the brain in a compressed and blurred state. Therefore, the width of the filter is wide. In FIG. 7, the filter shape of the spatial filter 260 is illustrated using shading. The small white area of the Lum indicates that the filter width is narrow.

S3: The perceptual image converting unit 12 converts the three types of signals into an XYZ signal, which is a perceptual color system.

S4: The perceptual image converting unit 12 converts the XYZ signal into a CIELAB space, which is a color space that is perceptually equal. The image converted into CIELAB space is called S-CIELAB in the sense of color after passing through a spatial filter of the visual system. In this embodiment, S-CIELAB is referred to as a perceptual image.

Figure 8:
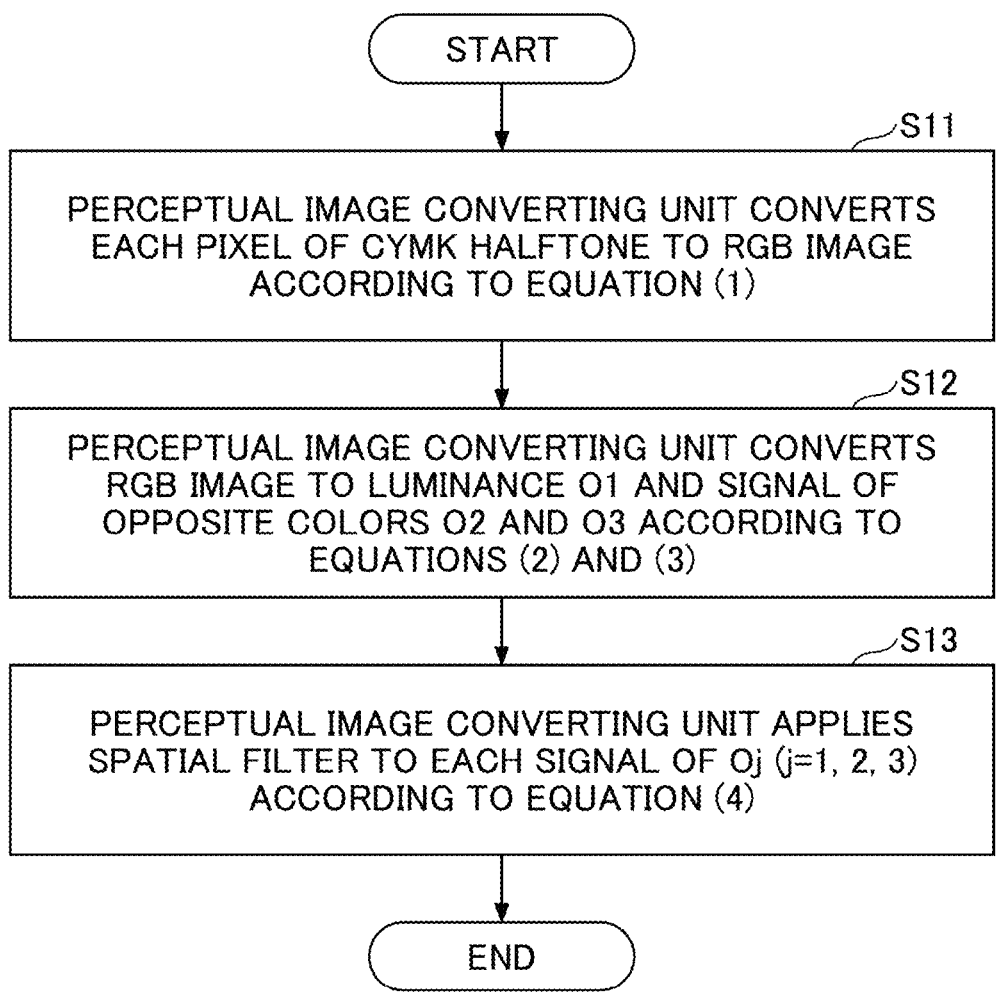
FIG. 8 is an example of a flowchart illustrating a procedure in which a perceptual image converting unit converts a halftone image to a perceptual image.

Next, with reference to FIG. 8, the process until the perceptual image converting unit 12 converts the halftone image to a perceptual image and outputs it will be described in detail. FIG. 8 is an example of a flowchart illustrating a procedure in which the perceptual image converting unit 12 converts a halftone image to a perceptual image.

S11: First, the perceptual image converting unit 12 converts each pixel of the halftone of CMYK into an RGB image by equation (1).

[Formula 1]

$$R = 1 - \min(1, C \times (1-K) + K)$$
$$G = 1 - \min(1, M \times (1-K) + K)$$
$$B = 1 - \min(1, Y \times (1-K) + K) \quad (1)$$

S12: Next, the perceptual image converting unit 12 converts the RGB image to a signal having brightness O1 and opposite colors O2 and O3 by Equation (2) and (3).

[Formula 2]

$$\begin{bmatrix} L \\ M \\ S \end{bmatrix} = \begin{bmatrix} 0.0209 & 0.0760 & 0.0112 \\ 0.0079 & 0.0764 & 0.0163 \\ 0.0009 & 0.0080 & 0.0766 \end{bmatrix} \begin{bmatrix} R \\ G \\ B \end{bmatrix} \quad (2)$$

$$\begin{bmatrix} O1 \\ O2 \\ O3 \end{bmatrix} = \begin{bmatrix} 0.9900 & -0.1060 & -0.0940 \\ -0.6690 & 0.7420 & -0.0270 \\ -0.2120 & -0.3540 & 0.9110 \end{bmatrix} \begin{bmatrix} L \\ M \\ S \end{bmatrix} \quad (3)$$

S13: Next, for each signal Oj (j=1, 2, and 3), the perceptual image converting unit 12 applies a spatial filter using Equation (4).

[Formula 3]

$$f^j = k^j \sum_i w_i^j E_i^j \quad (4)$$

$$E_i^j = k_i^j \exp\left(\frac{-(x^2 + y^2)}{(\sigma_i^j)2}\right)$$

The spatial filter is the weighted mixture of three Gaussians for O1 and the weighted mixture of two Gaussians for O2 and O3. The lower part of the equation (4) below is one Gaussian filter. Symbols x and y designate image coordinates, $k_i^j$ designates the normalization parameter for causing the sum of $E_i^j$ to be 1, and $\sigma_i^j$ is the standard deviation of the Gaussian. The upper part of the equation (4) is an equation of the weighted mixture, where $w_i^j$ designates the weight, and $k^j$ designates the normalized parameter for causing the sum of the filters $f^j$ to be 1.

The values of $\sigma_i^j$ and $w_i^j$ are determined from the human visual characteristics. According to Non-Patent Document 1, $\sigma_i^j$ and $w_i^j$ have the values illustrated in Table 1.

TABLE 1

| Plane | Weights $\omega_i$ | Spreads $\sigma_i$ |
|---|---|---|
| Lum | 0.921 | 0.0283 |
|  | 0.105 | 0.133 |
|  | −0.108 | 4.336 |
| Red-green | 0.531 | 0.0392 |
|  | 0.330 | 0.494 |
| Blue-yellow | 0.488 | 0.0536 |
|  | 0.371 | 0.386 |

$\sigma_i^j$ varies with the relationship between the visual distance and the dpi of the print and is obtained by multiplying the values in Table 1 by the following:

[Formula 4]

$$\text{sample}/deg = \frac{dpi}{\frac{180}{\pi}\tan^{-1}\left(\frac{1 \text{ inch}}{\text{viewing distance}}\right)} \quad (5)$$

Equation (5) illustrates that the larger the viewing distance (away) and the dpi, the larger the σ becomes. Therefore, the filter width becomes larger to cause the image to be further blurred.

Using the above, the perceptual image converting unit 12 convolutes the corresponding spatial filters into O1, O2, and O3 and converts the corresponding spatial filters into CIELAB, which is a uniform color space, through the XYZ color space. This is an image of S-CIELAB space (referred to as a perceptual image in this embodiment).

In order to determine whether the two halftone images are the same, the information processing apparatus 10 converts the two halftone images into an S-CIELAB space and obtains a color-difference image between the two halftone images.

<Perceptual Image>

Figure 9:
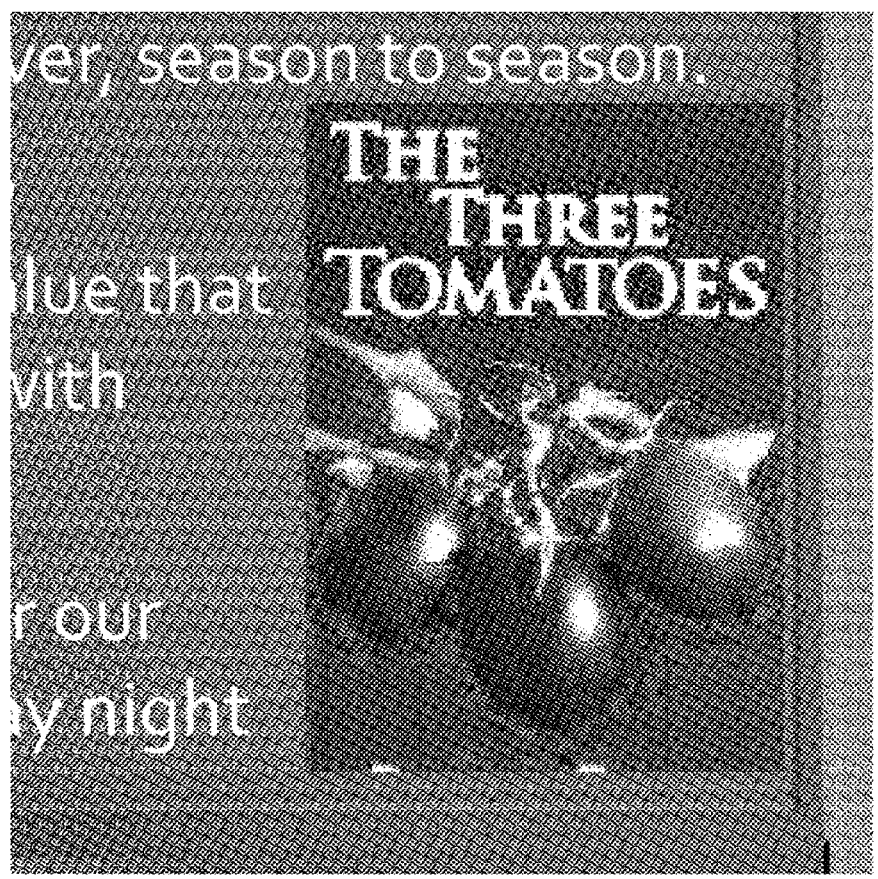
FIG. 9 illustrates an example of an RGB image.
Figure 10:
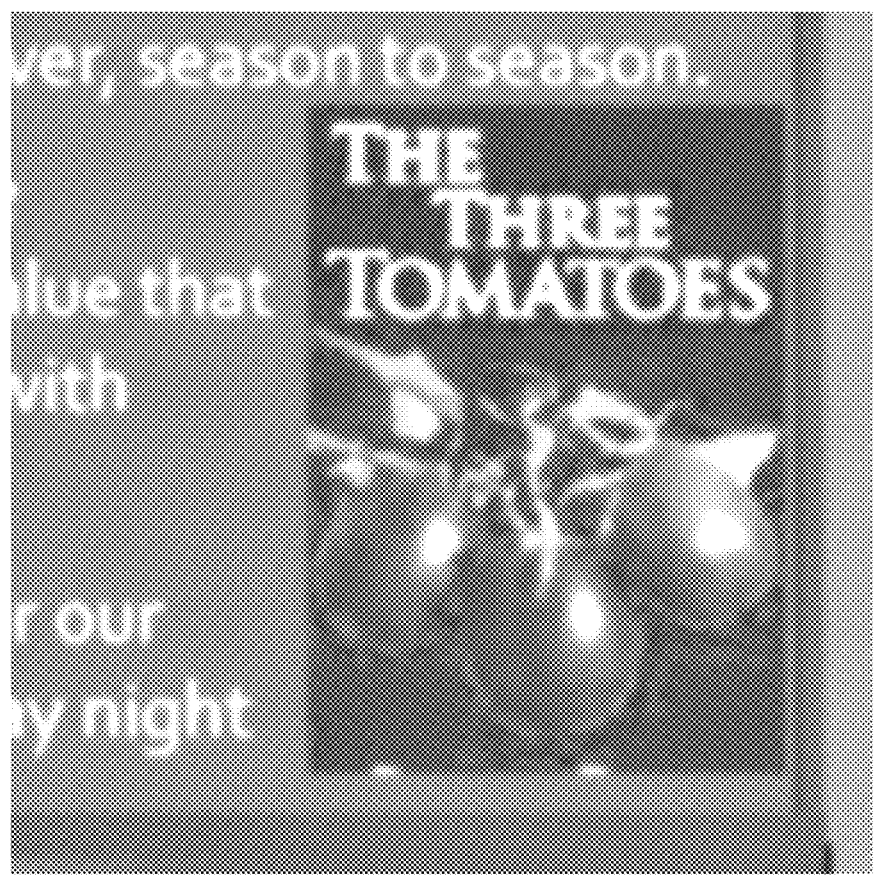
FIG. 10 illustrates an example of a perceptual image generated from the RGB image illustrated in FIG. 9.

FIG. 9 illustrates an RGB image, and FIG. 10 illustrates an example of a perceptual image obtained from the RGB image of FIG. 9. Due to the limitations in illustration, FIGS. 9 and 10 are monochrome. However, FIGS. 1 and 10 are actually color images. The perceptual image tends to be flattened in comparison with the RGB image.

<Color-Difference Image>

Figure 11:
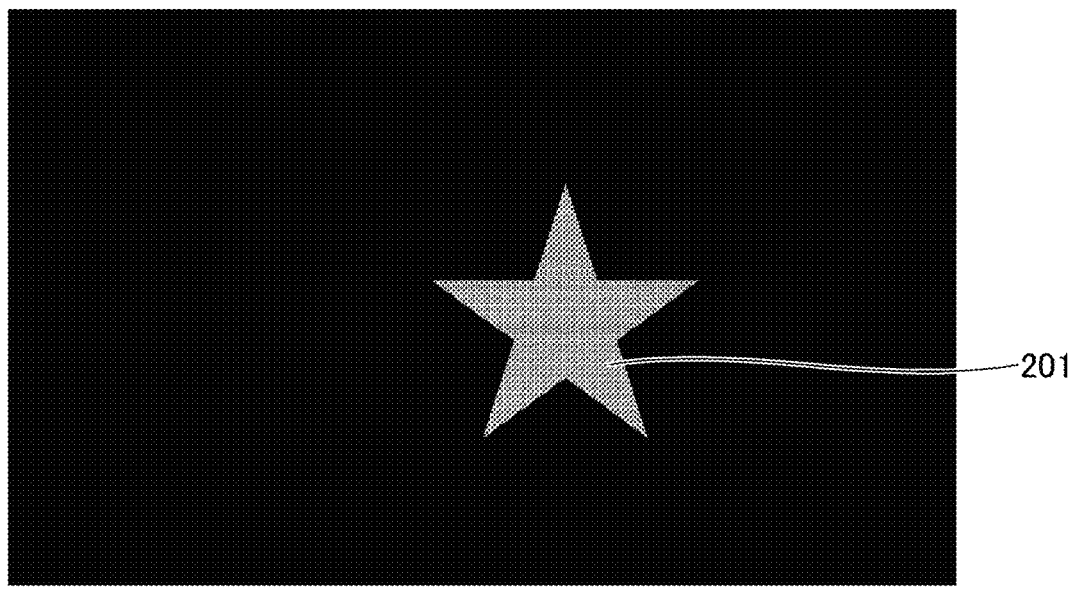
FIG. 11 illustrates an example of a color-difference image obtained as a difference between two perceptual images.

FIG. 11 illustrates an example of a color-difference image obtained as the difference between two perceptual images. Said differently, for a set of perceptual images, the difference (color-difference value) between pixel values (dots) which is calculated by the collating unit 13 for each pixel (dot) is the color-difference image. Because the color-difference value is equal to or more than 0, the color-difference value assigned to the color-difference value of the gray scale pixel value by the collating unit 13 is the color-difference image.

In FIG. 11, a pixel with a color-difference value of 0 (a portion without a color difference) is expressed by black. Pixels with color differences (the portion of the star 201) are illustrated in gray corresponding to the gray scale. The color-difference image means that the closer the color is to white, the larger the color-difference value.

Figure 12:
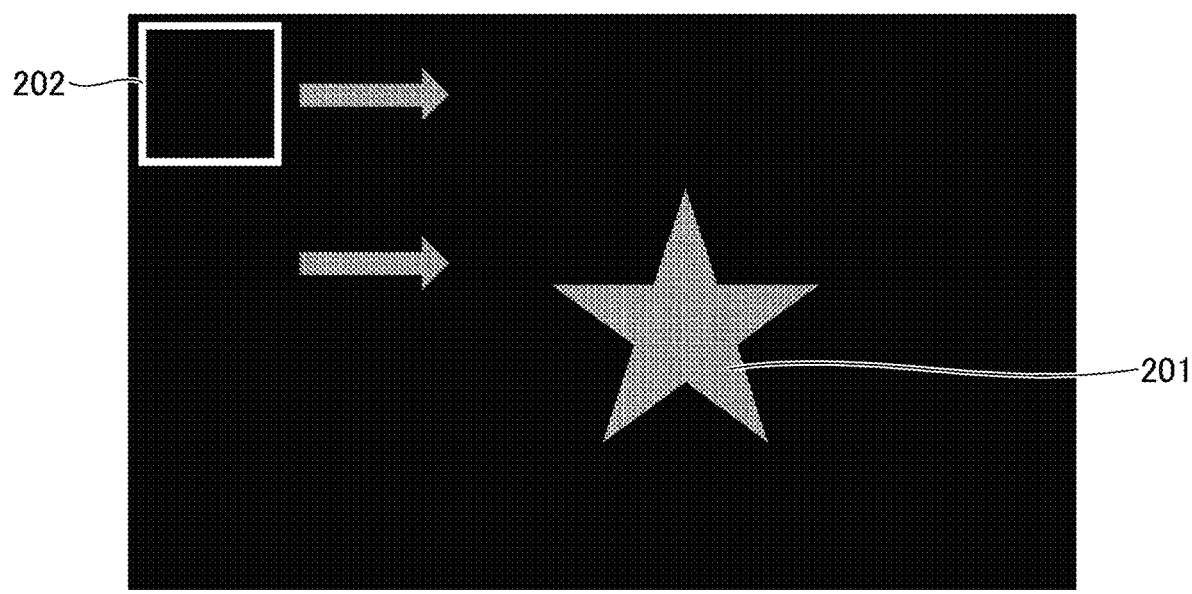
FIG. 12 illustrates a method of calculating a color-difference average of the color-difference image.
Figure 13:
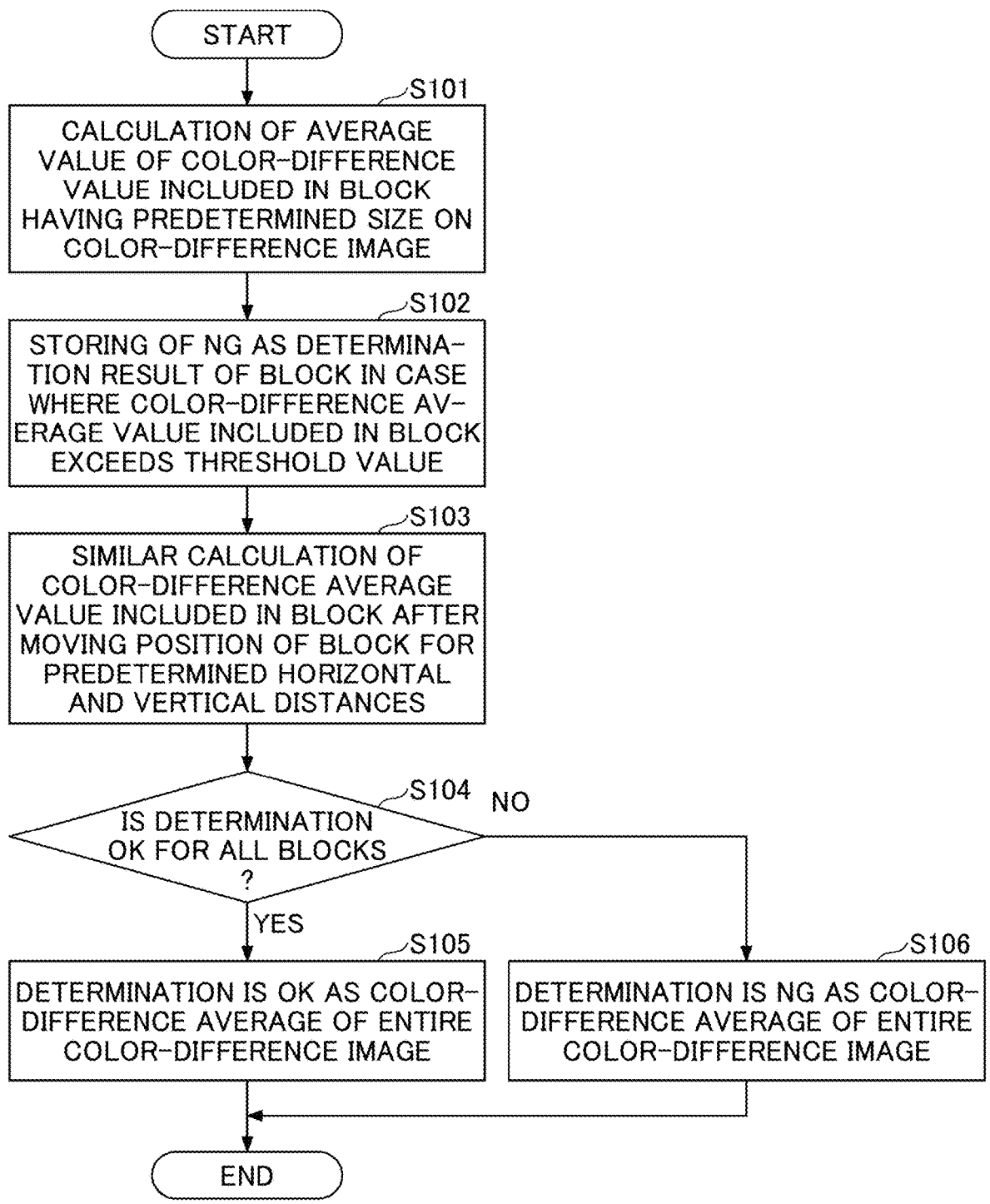
FIG. 13 is an example of a flowchart illustrating a procedure in which the collating unit calculates the color-difference average of the color-difference image.

Next, the color-difference average of the color-difference image will be described with reference to FIG. 12. FIG. 12 is a diagram illustrating a method of calculating the color-difference average of the color-difference image. FIG. 13 is an example of a flowchart illustrating a procedure of the collating unit 13 for calculating a color-difference average of a color-difference image.

First, the collating unit 13 calculates the average value of the color-difference values in the block 202 for the color-difference image (S101). Therefore, one color-difference average value is calculated for one block. The size of the block 202 is arbitrarily determined. This block 202 corresponds to the ROI. Therefore, it is better to determine experimentally by referring to a human organoleptic test and so on.

Next, the collating unit 13 determines whether the color-difference average value in the block 202 exceeds the threshold value. If the color-difference average value exceeds the threshold value, the collating unit 13 stores NG as the determination result of the block 202 (S102). When the value does not exceed the value, the collating unit 13 stores OK as the result of the determination of the block 202. The threshold is arbitrarily and experimentally determined from the human organoleptic test and the like.

Next, the collating unit 13 moves the position of the block 202 vertically or horizontally by a predetermined distance to calculate the color-difference average value in a manner similar thereto (S103). That is, the block 202 is scanned from left to right at a predetermined distance, and when it reaches the right end, it returns to the left end and repeats the scanning in the right direction. This predetermined distance may be arbitrarily determined. The scanning direction may be left to right, top to bottom, or bottom to top.

The collating unit 13 calculates the color difference average value of the blocks 202 in the entire color-difference image, and determines whether the determination result is OK in all the blocks 202 (S104).

When the determination result is OK in all blocks 202, the collating unit 13 determines that the determination result of the entire color-difference image is OK in the color-difference average (S105).

When the determination result is NG even in one block 202, the collating unit 13 determines that the determination result of the entire color-difference image is NG in the color-difference average (S106).

Figure 14:
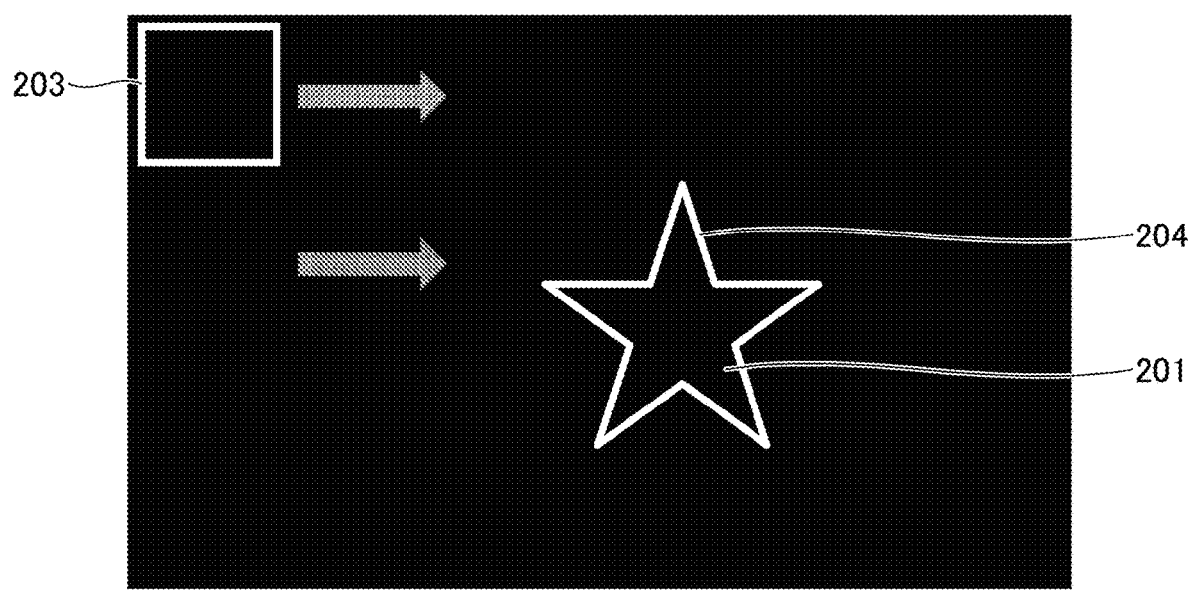
FIG. 14 illustrates a calculation method for calculating a color-difference gradient average of the color-difference image.
Figure 15:
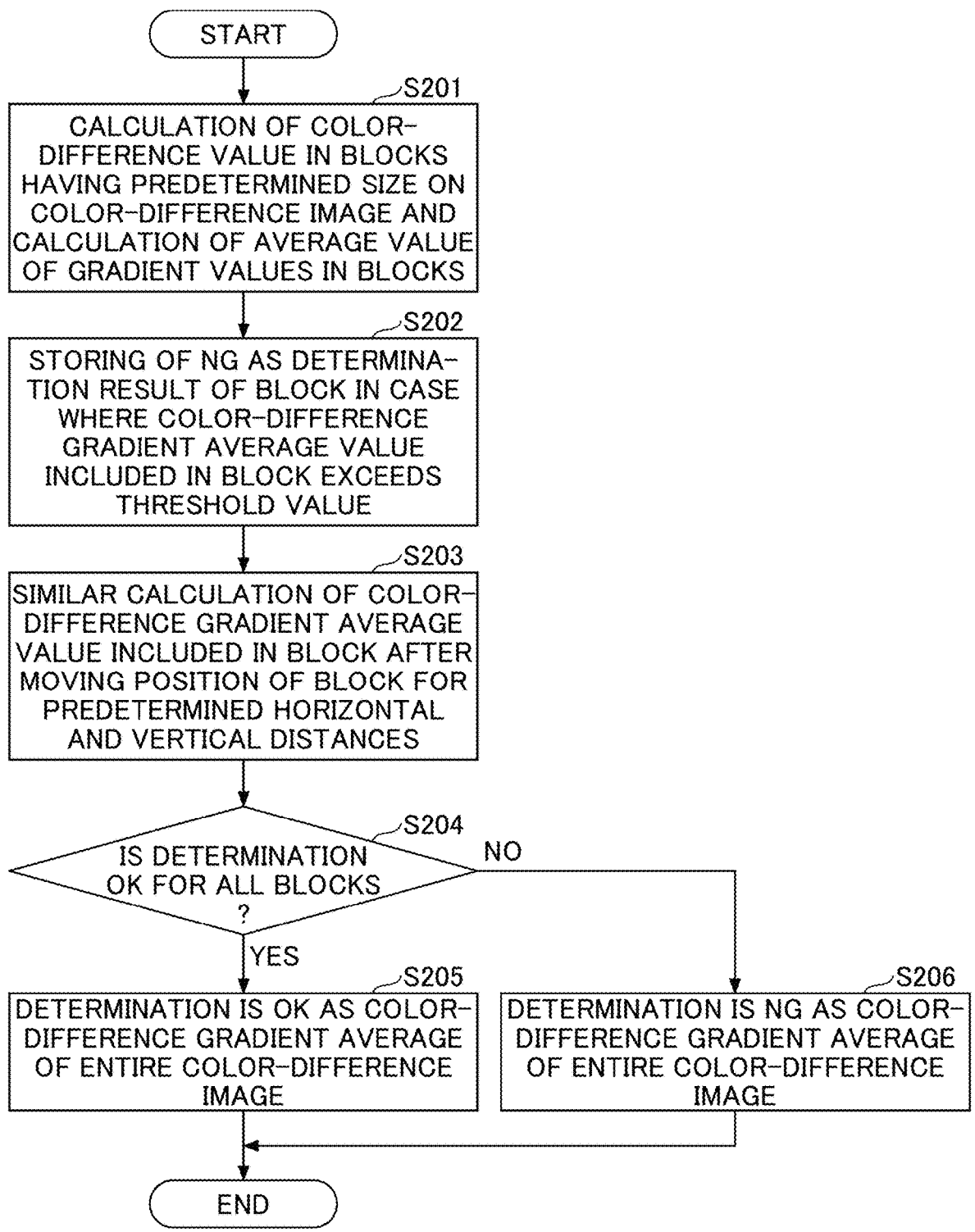
FIG. 15 is an example of a flowchart illustrating a procedure in which the collating unit calculates the color-difference gradient average of the color-difference image.

Next, the color-difference gradient average of the color-difference image will be described with reference to FIG. 14. FIG. 14 illustrates a calculation method of a color-difference gradient average of a color-difference image. FIG. 15 is an example of a flowchart illustrating a procedure for calculating a color-difference gradient average of a color-difference image of a collating unit 13.

First, the collating unit 13 calculates the gradient of the color-difference value in the block 203 for the color-difference image and calculates the average value of the gradient values in the block 203 (S201). Therefore, one color-difference gradient average value is calculated in one block 203. The size of the block 203 is as desired. The size of the gradient average block 202 may be the same or different. Also, although the method for calculating the gradient is as desired, examples of such filters include Prewitt and Sobel filters. These are sometimes referred to as gradient filters or first-order differential filters and are used for edge detection. The collating unit 13 uses these to calculate the gradient of the color-difference values in the vertical and horizontal directions, respectively.

Next, the collating unit 13 determines whether the average value of the color difference gradient in the block 203 exceeds the threshold value. If the average value exceeds the threshold value, the collating unit 13 stores NG as the result of the determination of the block 203 (S202). If the value does not exceed the threshold value, OK is saved as the determination result of the block 203. The threshold is arbitrarily determined. However, the threshold may be experimentally determined from a human organoleptic test and the like.

Next, the collating unit 13 causes the position of the block 203 to move vertically or horizontally by a predetermined distance, and similarly calculates the color-difference gradient average value (S203). Said differently, the block 203 is scanned from left to right at a predetermined distance, and when the block 203 reaches the right end, it returns to the left end and repeats the scanning in the right direction. The predetermined distance may be arbitrarily determined. The scanning direction may be left to right, top to bottom, or bottom to top.

The collating unit 13 calculates the color-difference gradient average value of the blocks 203 in the entire color-difference image and determines whether the determination result is OK in all blocks 203 (S204).

When the determination results are OK in all blocks 203, the collating unit 13 determines that the determination result of the entire color-difference image in the color-difference gradient average is OK (S205).

When the determination result is NG even in one block 203, the collating unit 13 determines that the determination result of the entire color-difference image in the color-difference gradient average is NG (S206).

FIG. 14 illustrates a color-difference image after calculating the gradient as an example. Because the gradients are calculated, the contour (edge) 204 of the star shape 201, which is a portion having a large color difference, is extracted. In such an edge portion, NG is likely to be saved as the determination result of the blocks.

<Example of Display of Comparison Results>

Figure 16:
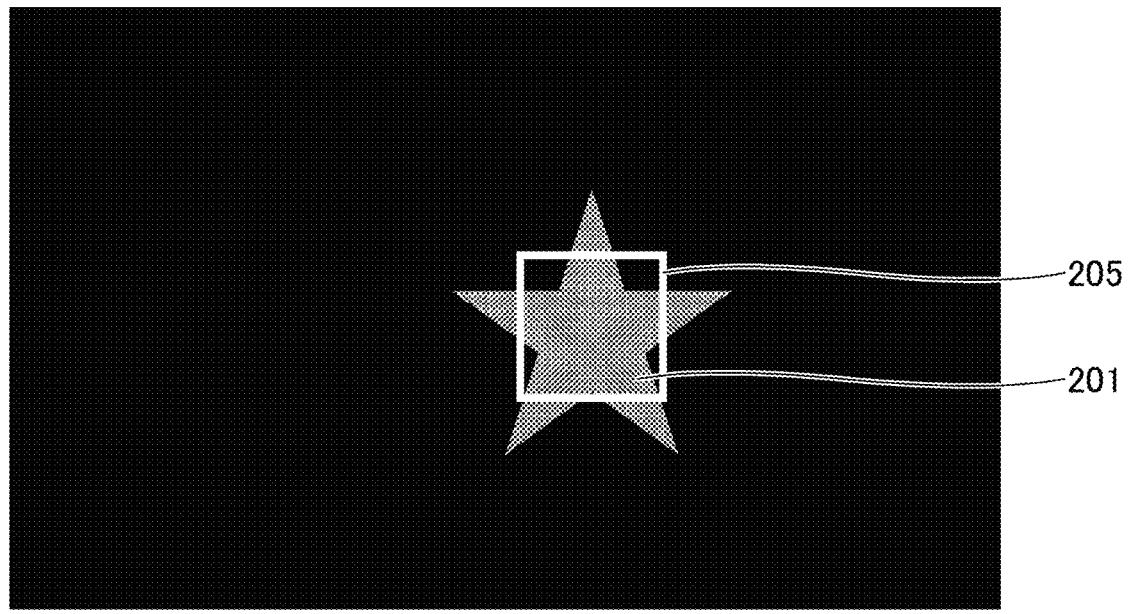
FIG. 16 illustrates an example of comparison results based on the color-difference average and a color-difference gradient average.

FIG. 16 illustrates a display example of a comparison result based on the color-difference average and color-difference gradient average. In the color-difference image, the comparison result outputting unit 14 highlights the area of the block that is determined NG. In FIG. 16, the block determined NG is highlighted with a red frame 205. FIG. 16 illustrates that the color-difference average or color-difference gradient average value in the frame 205 has exceeded the threshold value.

In FIG. 16, the frame 205 is a single frame. However, in the case where the plurality of blocks are determined NG, the plurality of frames 205 are displayed for as many as the number of blocks that are determined NG. In this case, the multiple frames 205 may overlap in part depending on the moving distance of the block and block size setting.

The comparison result outputting unit 14 may emphasize blocks determined NG with respect to the color-difference average and blocks determined NG with respect to the color-difference gradient average using different colors. In addition, the comparison result outputting unit 14 may display only one from among the blocks determined NG with respect to the color-difference average and the blocks determined NG with respect to the color-difference gradient average, depending on the operation of the user.

<Operation Procedure>

Figure 17:
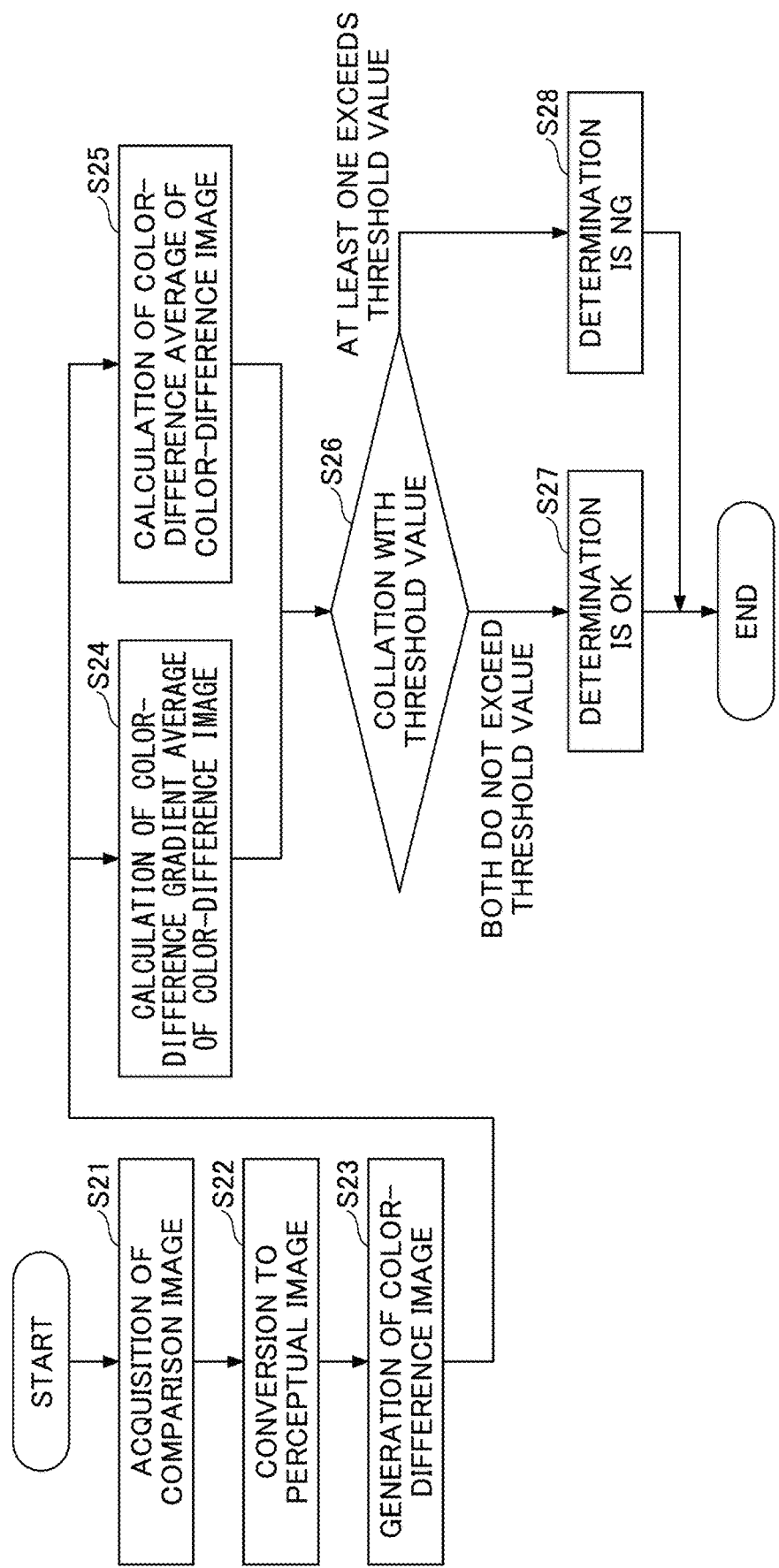
FIG. 17 illustrates an example of a flowchart illustrating a procedure in which the information processing apparatus converts two halftone images to the perceptual image and determines whether they match.

FIG. 17 illustrates an example of a flowchart of a procedure in which the information processing apparatus 10 converts two halftone images into the perceptual image to determine whether the two halftone images match.

First, the comparison image inputting unit 11 acquires a set of comparison images (which may or may not be halftone images) (S21). The set of comparison images is, for example, image data generated by a printer driver in 32-bit Windows ("Windows" is a registered trademark) and image data generated by the printer driver in 64-bit Windows ("Windows" is a registered trademark). Alternatively, the image data is generated by printer drivers with different versions on the same OS. Both the OS and the printer driver may be different.

Next, the perceptual image converting unit 12 converts the set of the received comparison images into perceptual images, respectively (S22).

Next, the collating unit 13 generates a color-difference image from two perceptual images (S23). A color-difference image is a difference of each pixel between two perceptual images.

The collating unit 13 performs the following processes for the color-difference image (S24 and S25):

Calculation of the color-difference gradient average for the color-difference images; and Calculation of the color-difference average for the color-difference images.

Next, the collating unit 13 determines whether each of these calculated values exceeds the threshold value (S26). The details are described in FIGS. 13 and 15 above.

When both of these calculated values do not respectively exceed the threshold values, the collating unit 13 determines that the comparison images are the same, and the comparison result outputting unit 14 outputs the determination as OK (S27).

When either one of these calculated values exceeds the threshold value, the collating unit 13 determines that there is a difference in the comparison image (not the same), and the comparison result outputting unit 14 outputs the determination as NG (S28).

<Example of Screen>

Figure 18:
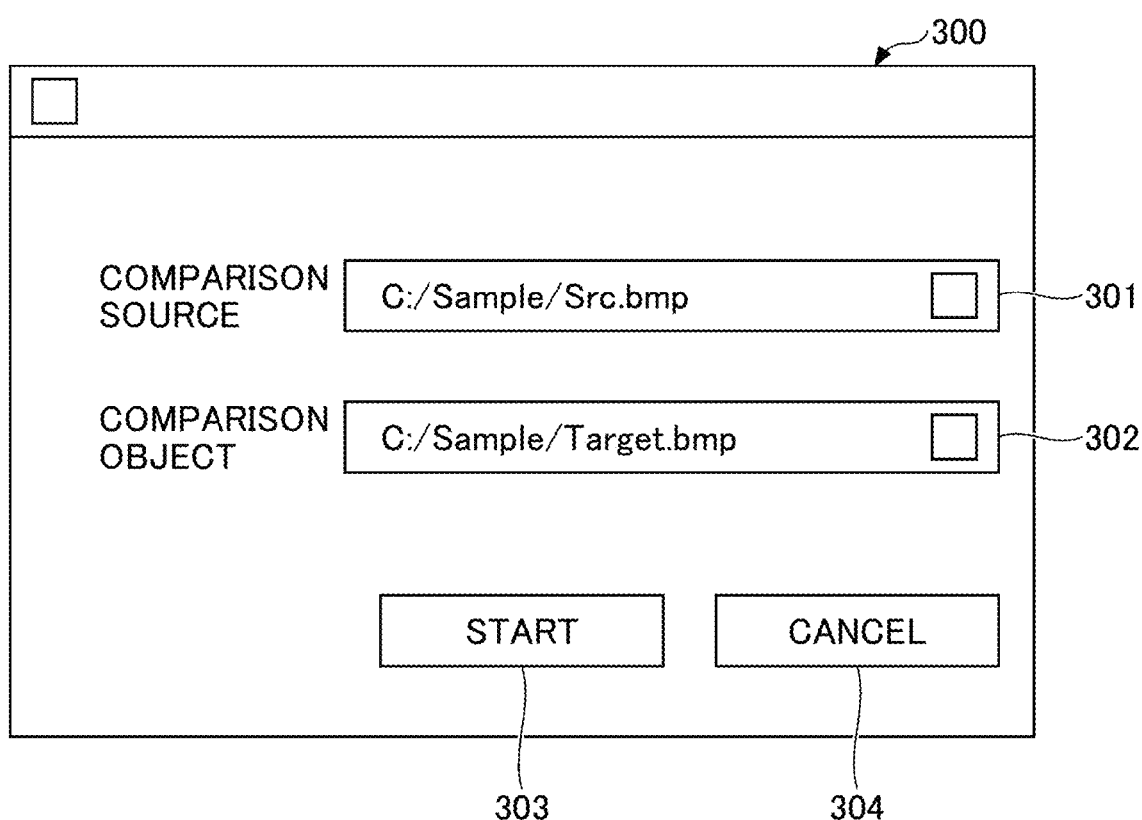
FIG. 18 illustrates an example of a comparison image designation screen displayed on a display by a comparison image inputting unit.

FIG. 18 illustrates an example of the comparison image designation screen 300 displayed on a display by the comparison image inputting unit 11. The comparison image designation screen 300 includes a comparison source file selection field 301, a comparison object file selection field 302, a start button 303, and a cancel button 304. In the source file selection field 301, the user designates the image of the comparison source. In the comparison object file selection field 302, the user designates the image of the comparison object. The reference image created by the current OS or printer driver is the comparison source, and the image created by the new OS or printer driver is the comparison object. However, it is arbitrary for the user to decide which image is the comparison source image and the comparison object image.

The user designates the comparison source image and the comparison object image and then depresses the start button 303. Thus, the comparison process described in FIG. 17 can be started. The user may also depress the cancel button 304 to pause the comparison process.

Figure 19:
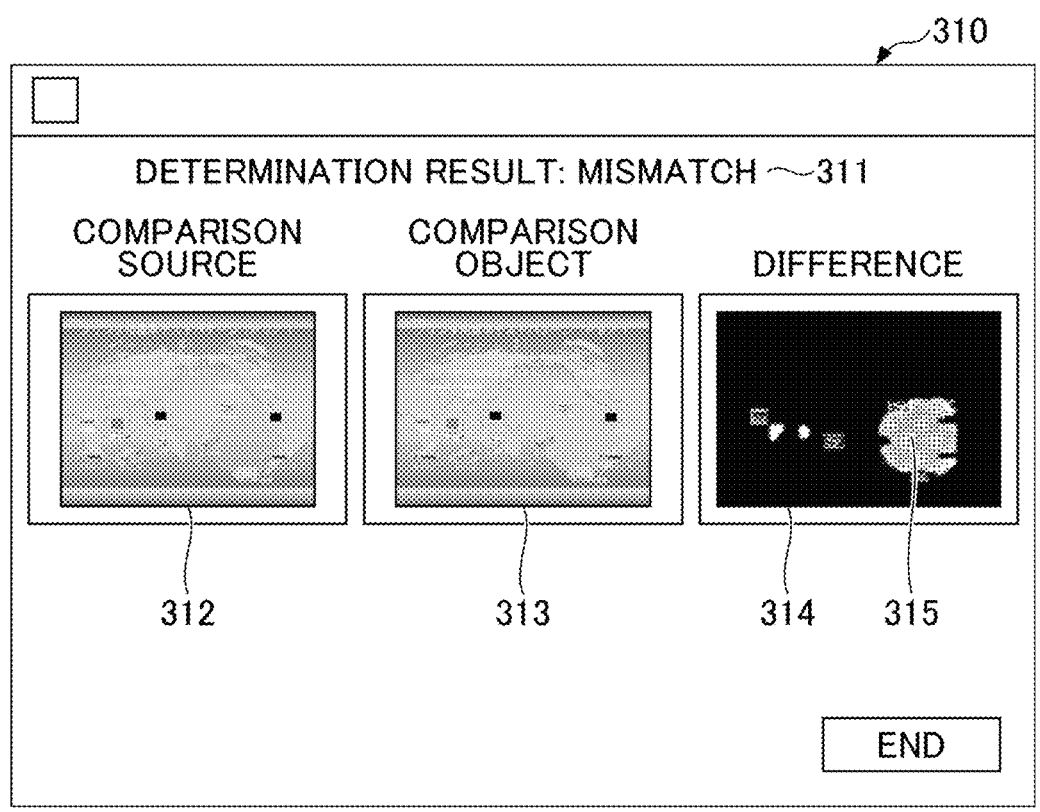
FIG. 19 illustrates an example of a comparison result screen displayed on the display by a comparison result outputting unit.

FIG. 19 is an example of a comparison result screen 310 displayed on the display by the comparison result outputting unit 14. The comparison result screen 310 displays two image data to be compared and a color-difference image on one screen. The comparison result screen 310 includes a determination result field 311, a comparison source image field 312, a comparison target image field 313, and a difference image field 314.

[Determination Result Field 311]

The determination result field 311 displays match or mismatch between the comparison images using a message or icons.

[Comparison Source Image Field 312]

The comparison source image field 312 displays the comparison source image. It may be an input image data or a perceptual image.

[Comparison Object Image Field 313]

The image of the comparison object image is displayed. It may be the input image data or the perceptual image.

[Difference Image Field 314 (Color-Difference Image)]

The difference image field 314 is the color-difference image of the perceptual image of the comparison source and the perceptual image of the comparison object. The color-difference image is displayed using colors according to the determination results for each of the above blocks. In FIG. 19, a black portion designates no difference. A white portion designates a portion where there is a difference but the human eye cannot determine this difference. Accordingly, the black portion is the portion where no difference is determined to be present by conventional signal processing (the method of calculating the difference for each pixel), and the white portion is the portion where the difference is determined to be present by conventional signal processing. A mesh portion 315 represents a point (a collection of blocks) where a difference of more than a threshold value is determined to be mismatch with respect to the color-difference image. Said differently, the mesh portion 315 designates a portion where there is a difference as a result of the ambiguous determination. Each block of the mesh portion 315 is highlighted in red or the like.

<Example Application of Ambiguous Determination>

Figure 20:
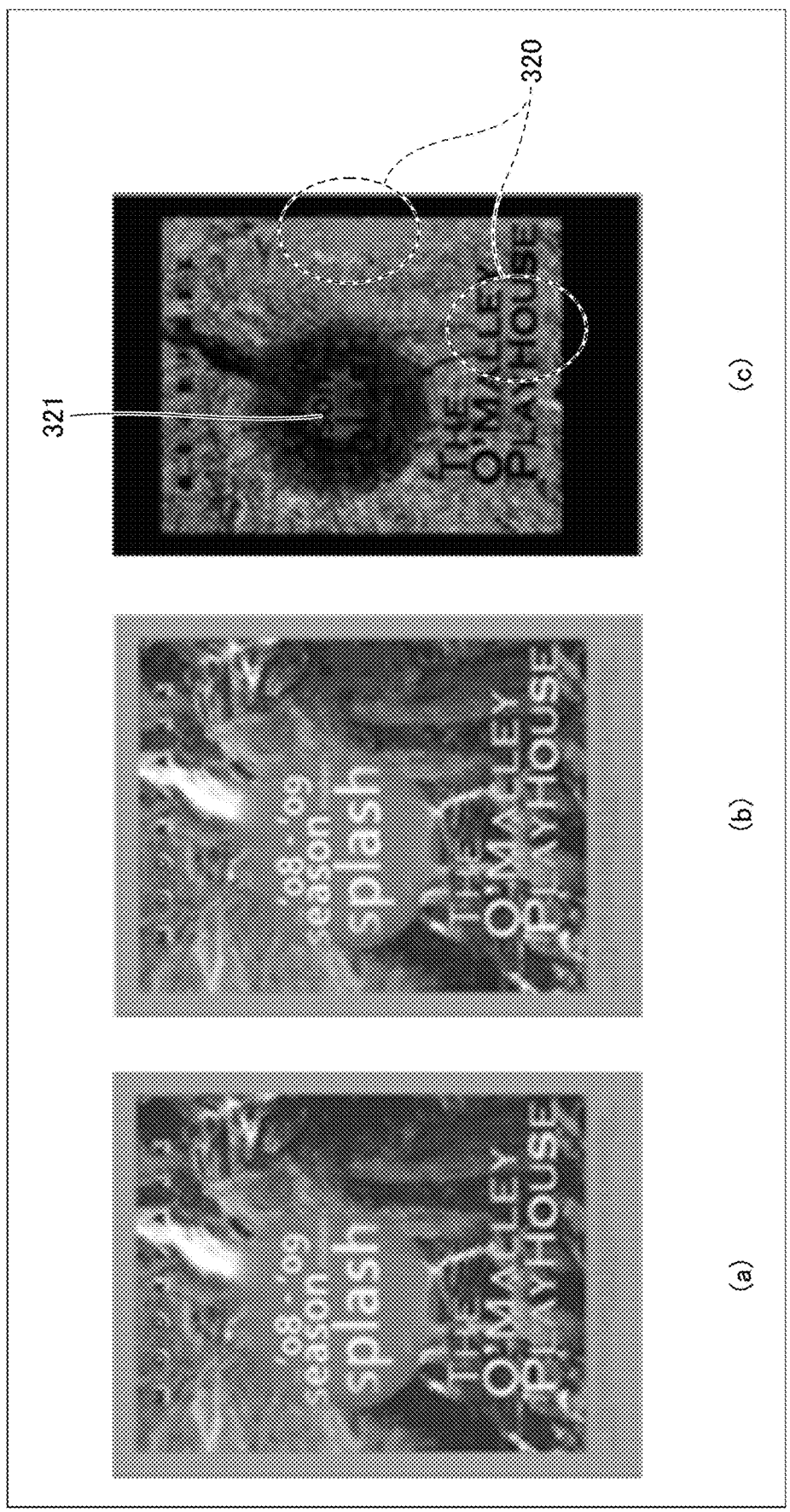
FIG. 20 illustrates an example in which the difference between input two halftone images is visually recognized by a visual determiner of a company, and the input two halftone images are determined to mismatch.
Figure 21:
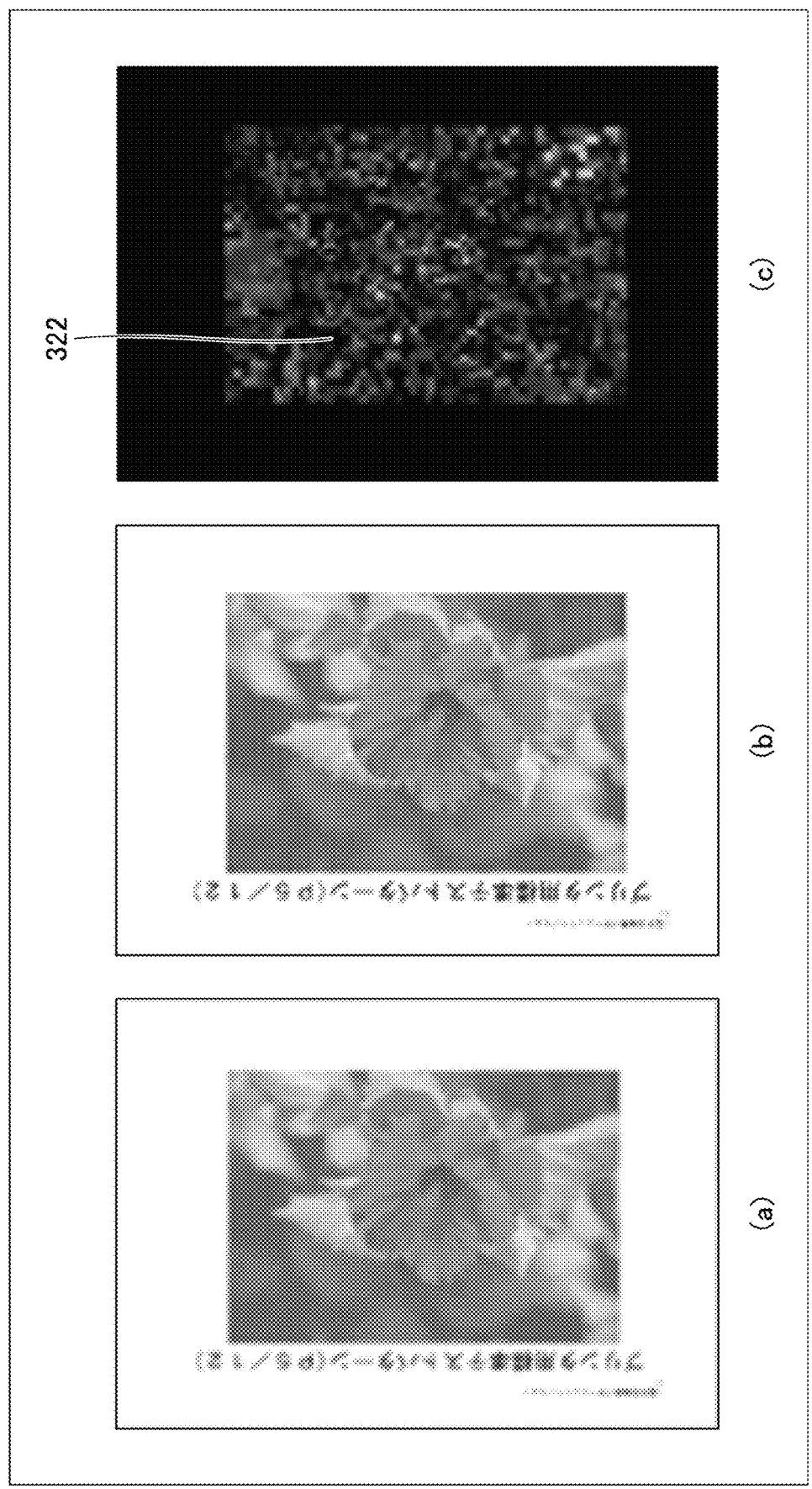
FIG. 21 illustrates an example in which the difference between the input two halftone images are not visually recognized by the visual determiner of the company and the input two halftone images are determined to match.

Referring to FIGS. 20 and 21, an example of the application of ambiguous determination is described. FIG. 20 illustrates an example in which the difference between two input halftone images input is visually recognized by a company's visual determiner and the two input images are determined to mismatch. In FIG. 20, (a) and (b) are halftone images respectively generated by different image processing. In FIG. 20, (c) is a color-difference image. In FIG. 20, the portion 321 in (c) is determined to be a difference image (having a portion that is different between the difference images in signal processing). The portion 320 is determined not to be the same when the information processing apparatus 10 performs the ambiguous determination. This result is consistent with the result of visual collation (the portion 321 does not have a difference and the portion 320 has a difference).

On the other hand, FIG. 21 illustrates an example in which a difference between the input two halftone images was not visually recognized by the company's visual determiner and the input two halftone images were determined to match. In FIG. 21, (a) and (b) are a halftone image generated by different processes. FIG. 21, (c), illustrates a color-difference image. In FIG. 21, (c), the portion 322 is a difference image (having a portion that is different between the difference images in signal processing) and the difference is detected in the signal processing and there is mismatch. Further, in FIG. 21 (c), even when the information processing apparatus 10 performs the ambiguous collation, there is no place where the mismatch is determined. This event matches the result of visual collation (the portion 322 does not have the difference).

In the method based on the conventional signal processing, the images illustrated in FIG. 21 mismatch. However, in the ambiguous collation of the present embodiment considering the visual function, the human visual collation result can be substantialized.

<Another Applied Example>

While the preferred embodiment of the present invention has been described with reference to examples, various modifications and substitutions may be made thereto without departing from the spirit and scope of the invention.

For example, the configuration example illustrated in FIG. 6 or the like is obtained by dividing according to a main function in order to facilitate understanding of processing by the information processing apparatus 10. The invention of the present application is not limited by the way of dividing the processing unit or by the name of the processing unit. The processing of the information processing apparatus 10 may be divided into more processing units depending on the processing contents. Alternatively, a single processing unit can be split to include more processing.

The functions of the embodiments described above may also be implemented by one or more processing circuits. As used herein, a "processing circuit" includes a processor programmed to perform each function by software, such as a processor implemented in electronic circuits, an Application Specific Integrated Circuit (ASIC), a Digital Signal Processor (DSP), a Field Programmable Gate Array (FPGA), or a conventional circuit module, which are designed to perform each function as described above.

Effects of the Invention

It is possible to provide an information processing apparatus capable of approximating the determination result of whether the two image data are the same to the human determination result.

EXPLANATION OF NUMERICAL REFERENCES

10: Information processing apparatus
11: Comparison image inputting unit
12: Perceptual image converting unit
13: Collating unit
14: Comparison result outputting unit

What is claimed is:

1. An information processing apparatus comprising:
   circuitry; and
   a memory, wherein the circuitry is configured to perform
      perceptual image conversion of converting two image data, generated from one color image data, each image data of the two image data being converted into a corresponding perceptual image based on human visual characteristics,
      collation of determining whether the two perceptual images corresponding to the two image data converted by the perceptual image conversion are the same, and
      comparison result outputting of outputting the comparison result by the collation, wherein
         in the perceptual image conversion the two image data are converted to a signal of a luminance O1 and signals respectively of opposite colors O2 and O3, and each perceptual image of the two perceptual images is generated by applying a spatial filter to each signal Oj(j=1,2,3).

2. The information processing apparatus according to claim 1, wherein
   the collation
      generates a color-difference image of the two perceptual images, and
      determines, when a color-difference gradient average of the color-difference image is equal to or greater than a threshold value, that the two image data are not the same.

3. The information processing apparatus according to claim 2, wherein
the collation determines that the two image data are not the same when a color-difference average of the color-difference image is equal to or greater than another threshold value.

4. The information processing apparatus according to claim 1, wherein
   the collation determines that the two image data are the same when a color-difference gradient average of the color-difference image is not equal to or greater than a threshold value and a color-difference average of the color-difference image is not equal to or greater than another threshold value.

5. The information processing apparatus according to claim 3, wherein
   the comparison result output displays the two image data and the color-difference image on one screen.

6. The information processing apparatus according to claim 5, wherein
   the collation calculates the color-difference gradient average of the color-difference image and the color-difference average of the color-difference image for each block, and
   the comparison result output highlights the block having the color-difference gradient average equal to or greater than the threshold value or the color-difference average equal to or greater than the another threshold value in the color-difference image.

7. The information processing apparatus according to claim 1, wherein
   the two image data are halftone images generated by a process of expressing a pseudo intermediate color by reducing a number of gradations of color image data in a state where at least one from among a number of bits of an operating system and a printer driver differs in the two image data.

8. The information processing apparatus according to claim 1,
   the perceptual image generation applies the spatial filter to each signal Oj(j=1,2,3) using following equations $$f^j = k^j \sum_i w_i^j E_i^j$$

$$E_i^j = k_i^j \exp\left(\frac{-(x^2 + y^2)}{(\sigma_i^j)2}\right)$$

where x, y, designate image coordinates $k_i^j$ is a normalized parameter causing the sum of $E_i^j$ to be 1; $\sigma_i^j$ is the standard deviation of the Gaussian distribution; $w_i^j$ is a weight; and $k^j$ is a normalization parameter to cause the sum of the filter $f^j$ to be 1.

9. An image collating method comprising:
   converting two image data, generated from one color image data, into two respective perceptual images based on human visual characteristics;
   determining collation whether the two perceptual images converted by the perceptual image conversion are same; and
   outputting a comparison result obtained by the determining the collation, wherein
      in the converting of the two image data into the two perceptual images, the two image data are converted to a signal of a luminance O1 and signals respectively of opposite colors O2 and O3, and each perceptual image of the two perceptual images is generated by applying a spatial filter to each signal $O_j(j=1,2,3)$.

10. A non-transitory computer-readable storage medium storing a program for causing a computer to execute an image collating method comprising:
 converting two image data, generated from one color image, data into two respective perceptual images based on human visual characteristics;
 determining collation whether the two perceptual images converted by the perceptual image conversion are same; and
 outputting a comparison result obtained by the determining the collation, wherein
  in the converting of the two image data into the two perceptual images, the two image data are converted to a signal of a luminance $O1$ and signals respectively of opposite colors $O2$ and $O3$, and each perceptual image of the two perceptual images is generated by applying a spatial filter to each signal $O_j(j=1,2,3)$.

11. The information processing apparatus according to claim 1, wherein the spatial filter is the weighted mixture of three Gaussians for $O1$ and the weighted mixture of two Gaussians for $O2$ and $O3$.

12. The image collating method according to claim 9, wherein the spatial filter is the weighted mixture of three Gaussians for $O1$ and the weighted mixture of two Gaussians for $O2$ and $O3$.

13. The non-transitory computer-readable storage medium according to claim 10, wherein the spatial filter is the weighted mixture of three Gaussians for $O1$ and the weighted mixture of two Gaussians for $O2$ and $O3$.

* * * * *